Dec. 11, 1956  G. G. HUDSON  2,773,661
AIRCRAFT EJECTION SEAT

Filed Aug. 1, 1955  3 Sheets-Sheet 1

INVENTOR:
GEORGE G. HUDSON
BY *James H. Bechell*
ATTORNEY

Dec. 11, 1956  G. G. HUDSON  2,773,661
AIRCRAFT EJECTION SEAT
Filed Aug. 1, 1955  3 Sheets-Sheet 3

INVENTOR:
GEORGE G. HUDSON
BY
ATTORNEY

United States Patent Office 2,773,661
Patented Dec. 11, 1956

2,773,661

AIRCRAFT EJECTION SEAT

George G. Hudson, Torrington, Conn., assignor, by mesne assignments, to Reconstruction Finance Corporation, Washington, D. C.

Application August 1, 1955, Serial No. 525,467

8 Claims. (Cl. 244—122)

My invention relates to aircraft seats, with particular reference to seats of the ejection type wherein seat and pilot are ejected as a unit from the aircraft.

One object of my invention is to provide a seat of this general type in which, on initiation of the ejection sequence, the seat bottom is raised or tilted. The purpose of this operation is to withdraw the pilot's feet from the aircraft controls and inwardly toward the seat before the beginning of the ejection operation. In this way, danger of the legs or feet of the pilot becoming entangled in the controls or striking some obstruction in the cockpit as he and the seat are being ejected is eliminated.

Another object of my invention is to provide a thigh hold-down strap which is in effect integral with the conventional lap belt, my construction providing for the thigh strap to be tightened when the seat bottom is elevated, thereby more tightly to strap or clamp the pilot to the seat and thus further reduce the likelihood of injury to the pilot on ejection.

Inasmuch as the initiation of the seat-elevating and strap-tightening operations requires merely a slight pull on a lanyard, the pilot may be barely conscious and yet be capable of initiating these operations.

In general, my invention relates to aircraft seats of the type wherein the seat and pilot are ejected as a unit through the top of the aircraft. Various types of ejection mechanism are available, and the specific type of ejection mechanism employed in connection with my invention is immaterial.

Before entering into a detailed discussion of my invention, it might be well to point out that in practice it is merely necessary for the seat occupant to pull a face curtain over his face, which movement will jettison the canopy above the pilot's head and remove the safety pin of the ejection apparatus without, however, firing the seat ejection charge. At the same time the seat inertia reel is locked. The manipulation of the face curtain also effects or initiates a sequence of steps related to my invention in that the seat bottom is elevated so as to retract the pilot's feet and tighten the thigh strap in order to hold the pilot more securely to the seat and provide for full support of his thighs during ejection. When the seat and occupant are well clear of the aircraft, the seat bottom restores itself to initial position, so that separation of seat and pilot is promoted, and escape of the pilot from the seat after ejection is facilitated. With the face curtain over the pilot's face, seat bottom elevated, and thigh strap tightened, the seat ejection charge is fired.

Inasmuch as the present invention is concerned primarily with elevation of the seat bottom and tightening of the thigh strap, I have omitted from the drawings any details of the manner in which the seat is mounted in the aircraft and any details of specific ejection mechanism by which the seat and pilot are ejected as a unit. These features are well known to those skilled in this industry, and, inasmuch as they constitute in effect no part of what I consider to be my inventive contribution to this field, a showing of such details would seem to be unnecessary and tend to confuse rather than to clarify this description.

In the accompanying drawings.

Figure 1:
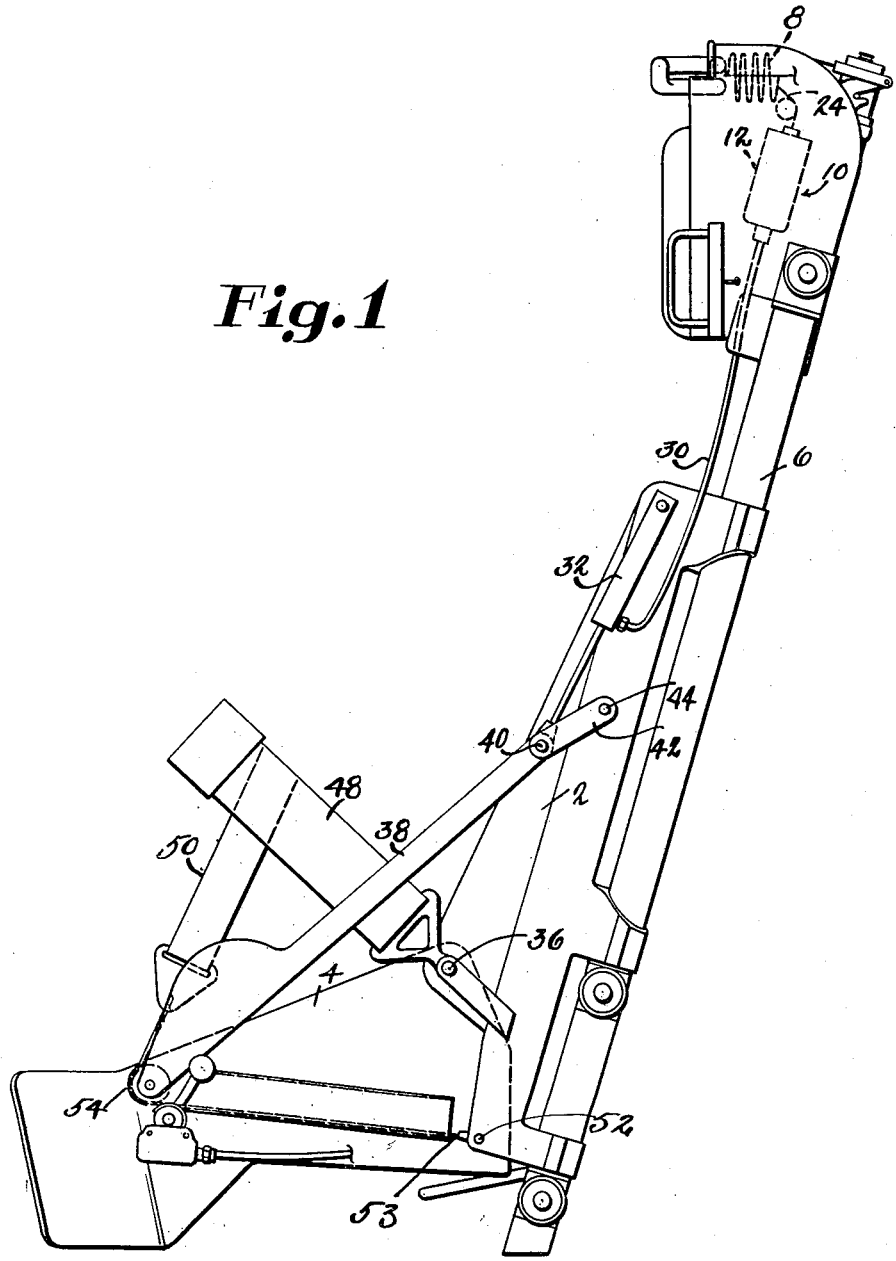
Fig. 1 is a side elevation of an ejection seat embodying my invention.
Figure 2:
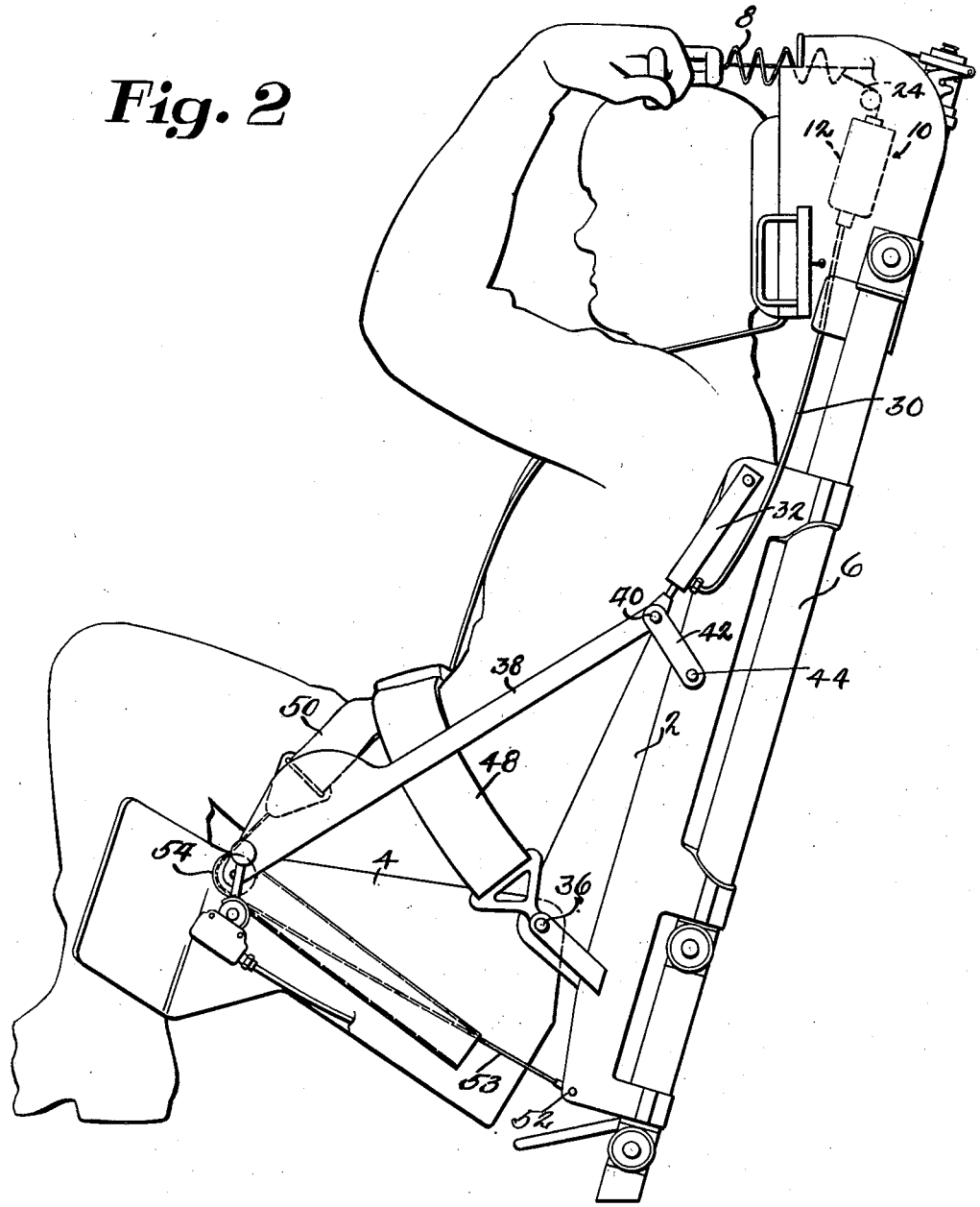
Fig. 2 is a view similar to Fig. 1 in that it is taken at the left side of the seat, but in this view the seat bottom has been elevated and thigh strap tightened.
Figure 3:
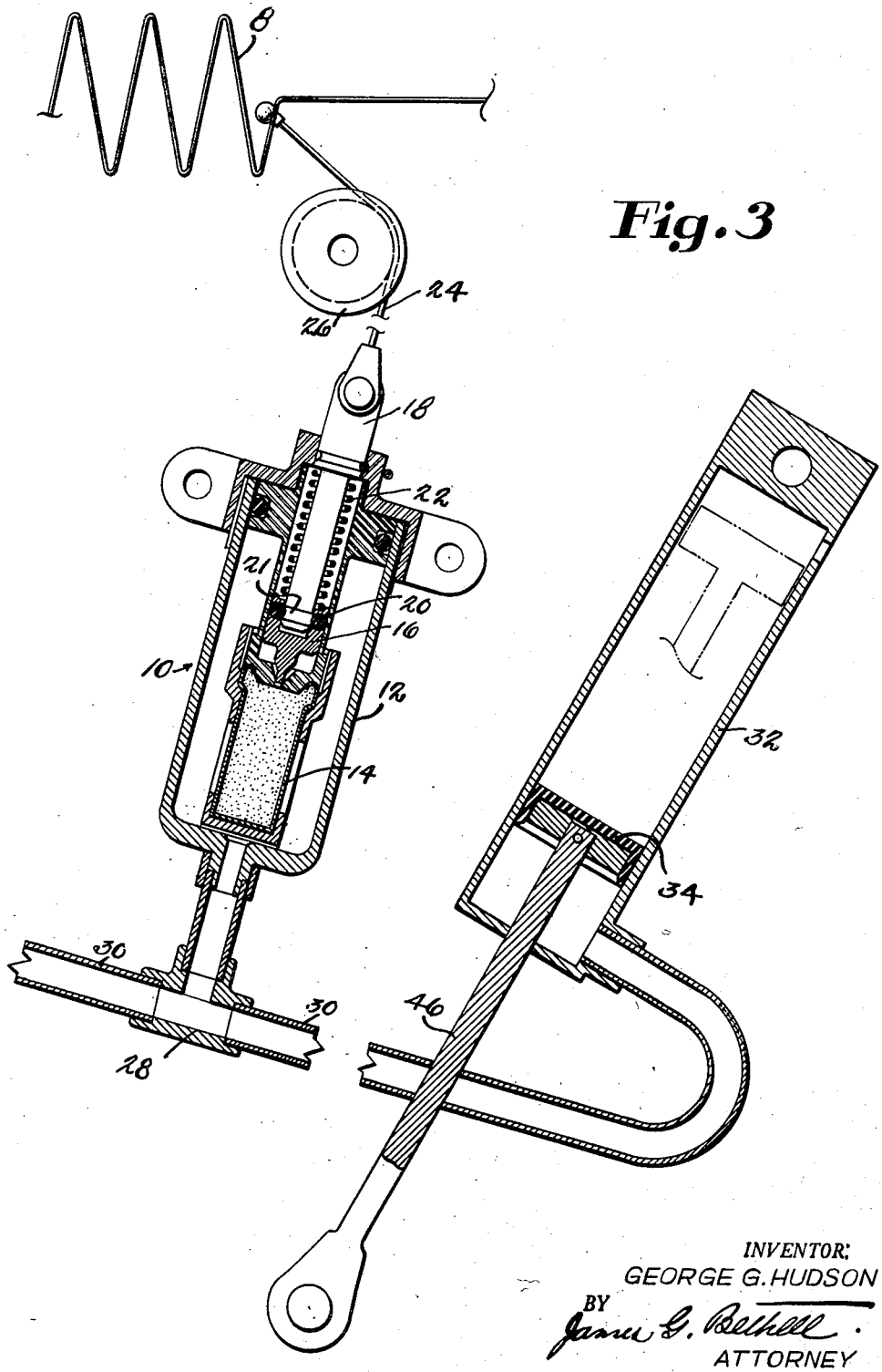
Fig. 3 is an enlarged, sectional view of some of the details of the mechanism for elevating the seat bottom.

Before proceeding with a detailed description of the drawings, I wish it to be noted that, so far as the seat-bottom-elevating mechanism and thigh-strap-tightening mechanism are concerned, everything shown on the drawings at the left side of the seat is duplicated at the right side of the seat.

Referring to the drawings in detail:

The seat back has been designated 2, while 4 designates the seat bottom. 6 designates the rails along which the seat slides upwardly during the ejection operation, seat and pilot being ejected through the canopy opening in the cockpit roof.

8 designates a face curtain, which is secured to the upper end of the seat back. In conventional practice, as the face curtain is pulled over the pilot's face, the canopy covering the opening in the roof of the cockpit is jettisoned, the catapult safety pin removed, the inertia reel for the seat locked, and the catapult charge is fired. In my improved construction, however, I provide for elevating the seat bottom 4 and tightening the pilot's thigh strap before the catapult or seat-ejection charge is fired. To accomplish this, I mount a device, which for descriptive purposes I shall call an "initiator," on the seat structure near the upper end of the seat back. This initiator is designated 10 and comprises a housing 12, containing a cartridge 14 and a firing pin 16. A pin 18 projects from the upper or rear end of the initiator housing. This rear actuator pin is normally locked in the position shown on the drawings by a plurality of steel balls 20, carried by the firing pin 16, which balls engage an annular groove 21 in the pin 18. The pin 18, when being retracted, causes the firing pin to compress a spring 22, so that, when the actuator pin is retracted sufficiently to become disengaged from the firing pin, the spring 22 will drive the firing pin 16 forward to fire the cartridge 14. The actuator pin 18 is attached to one end of a lanyard 24, which runs over an idler pulley 26 and is attached to the face curtain 8, so that, as the pilot begins to pull the face curtain over his face, the initiator cartridge 14 will be fired.

The lower end of the initiator housing is equipped with a T-fitting 28, which communicates through tubing 30 with two cylinders 32, mounted on the seat back at each side of the seat. Each of these cylinders is provided with a piston 34, so that, when the initiator charge is fired, the pistons 34 will be actuated upwardly, as viewed in the drawings.

The seat bottom 4 is pivoted to the seat back 2 at 36. Attached to the seat bottom at each side of the seat adjacent the front edge of the bottom are seat-actuator links 38, the upper end of each link being pivotally attached at 40 to the outer end of a short link 42, pivoted at 44 to each side of the seat back. The piston rod 46 of each of the seat-actuating pistons 34 is pivotally attached to the seat actuators 38 at the pivots 40.

48 designates the pilot's lap strap, which is of conventional design.

50 designates the pilot's thigh strap. This strap is sewn or riveted or otherwise permanently attached intermediate its ends to the lap strap 48. The ends of the thigh strap are attached to the seat back, as seen at 52, by means of a lanyard or other flexible connection 53, which passes about an idler roller 54, carried on the seat bottom at each side of the seat adjacent the front edge of the bottom.

It will be apparent from all of the foregoing that my invention provides an improvement in ejection seats for aircraft wherein, as the face curtain 8 is being pulled down, the initiator 10 will be fired, so that the gases generated will actuate the pistons 34, thereby pivoting the seat bottom to retract the pilot's feet from the aircraft controls and position his legs as if resting on footrests. At the same time, the thigh strap 50 is tightened, so that full support of the thighs is attained during ejection.

It is to be understood that changes may be made in the details of construction and arrangement of parts hereinabove described within the purview of this invention.

What I claim is:

1. In an aircraft ejection seat of the type wherein the seat occupant manipulates a face curtain to initiate the application of an ejecting force to the seat forcibly to eject the seat and its occupant as a unit from the aircraft, the combination of a seat back; a pivoted seat bottom; an initiator comprising an explosive charge which is fired in advance of seat ejection by manipulation of said face curtain; and a driving connection between the initiator and the seat bottom whereby, when said charge is fired, the seat bottom will be pivoted upwardly to withdraw the feet of the seat occupant toward the seat and away from the aircraft controls.

2. In an aircraft seat of the ejection type, the combination of a seat back; a seat bottom pivoted to the seat back; means controlled by the seat occupant to raise the seat bottom about its pivot; and a thigh strap for the seat occupant having its ends attached to a fixed portion of the seat whereby, as the seat bottom pivots upwardly, the said strap will be tightened about the occupant's thighs.

3. In an aircraft seat of the ejection type, the combination of a seat back; a seat bottom pivoted thereto; means controlled by the seat occupant to pivot said seat bottom to raise its front edge; a lap strap attached to the seat; and a thigh strap attached to said lap strap and having its ends attached to a fixed portion of the seat, so that, as the seat bottom pivots, the thigh strap will be tightened about the occupant's thighs.

4. In an aircraft seat of the ejection type, the combination of a seat back; a pivoted seat bottom; a face curtain and an initiator carried by the seat back, said initiator containing an explosive charge fired by actuation of the face curtain; a pair of cylinders and pistons attached to the seat back at each side thereof, the cylinders being in communication with the chamber of said initiator, so that, when the initiator is fired, said pistons will be actuated; and a linkage system attached to the piston rod of each piston and pivoted to the seat back and to the seat bottom whereby, when the charge of the initiator is fired, the seat bottom will be pivoted upwardly to withdraw the feet of the seat occupant away from the aircraft controls and inwardly toward the seat bottom.

5. In an aircraft seat of the ejection type, the combination of a seat back and a pivoted seat bottom; an initiator carried by the seat back and containing an explosive charge adapted to be fired by the seat occupant; a pair of cylinders and pistons attached to each side of the seat back, said cylinders being in constant communication with the chamber of the initiator, so that the said pistons will be actuated when the initiator is fired; and a linkage system attached to the rod of each piston, said systems being pivotally attached at one end to the seat back and at the other end to the seat bottom adjacent the front edge of the bottom whereby, upon operation of the initiator, the seat bottom will be pivoted upwardly to withdraw the feet of the seat occupant from the aircraft controls and inwardly toward the seat.

6. In an aircraft seat of the ejection type, the combination of a seat back; a pivoted seat bottom; a lap strap secured at each side of the seat to the seat back; a thigh strap attached intermediate its ends to the lap strap; an idler pulley secured to the seat bottom at each side thereof; and a flexible connector attached to each end of the thigh strap, said connectors passing about said idlers and being secured to the seat back, whereby upward pivoting of the seat bottom will tighten the thigh strap about the thighs of the seat occupant.

7. In an aircraft seat of the ejection type, the combination of a seat back; a seat bottom pivoted at its rear to said back; means mounted on the seat back above said seat bottom and controlled by the seat occupant for initiating pivoting of the seat bottom relatively to said back about the pivotal connection of the bottom and back to each other; and a driving connection between the said initiating means and the said seat bottom attached to the seat bottom forwardly of the pivotal connection between the seat bottom and seat back, whereby operation of the initiating means will effect upward pivoting of the seat bottom about said pivotal connection.

8. In an aircraft seat of the ejection type, the combination of a seat back; a seat bottom pivoted at its rear to said back; an initiator comprising an explosive charge for initiating pivoting of the seat bottom relatively to said back about the pivotal connection of the bottom and back to each other, said initiator being mounted on said back above the seat bottom; a driving connection between said initiator and the said seat bottom attached to the seat bottom forwardly of the pivotal connection between the seat bottom and seat back, whereby firing of the explosive charge of the initiator will pivot the seat bottom upwardly about the pivotal connection between the seat bottom and back; and firing mechanism carried by the seat back and controlled by the seat occupant for firing said explosive charge.

References Cited in the file of this patent

UNITED STATES PATENTS

| | | |
|---|---|---|
| 2,346,871 | Provenzano | Apr. 18, 1944 |
| 2,467,763 | Martin | Apr. 19, 1949 |
| 2,528,532 | Martin | Nov. 7, 1950 |
| 2,707,087 | Bradley | Apr. 26, 1955 |